(12) United States Patent
Douglas

(10) Patent No.: US 10,640,234 B1
(45) Date of Patent: May 5, 2020

(54) SYSTEM AND METHODS FOR AIRCRAFT LANDING PLATFORM CONTROL

(71) Applicant: Latitude Engineering, LLC, Tucson, AZ (US)

(72) Inventor: Jason Michael Douglas, Tucson, AZ (US)

(73) Assignee: L3 LATITUDE, LLC, Tucson, AZ (US)

( * ) Notice: Subject to any disclaimer, the term of this patent is extended or adjusted under 35 U.S.C. 154(b) by 510 days.

(21) Appl. No.: 15/410,682

(22) Filed: Jan. 19, 2017

(51) Int. Cl.
| | |
|---|---|
| *B64F 1/24* | (2006.01) |
| *B64C 25/32* | (2006.01) |
| *B08B 7/00* | (2006.01) |
| *B60L 53/14* | (2019.01) |
| *B60L 53/35* | (2019.01) |
| *B60L 53/60* | (2019.01) |
| *B64F 1/22* | (2006.01) |
| *B60L 53/66* | (2019.01) |
| *B64C 39/02* | (2006.01) |
| *B64F 1/36* | (2017.01) |

(52) U.S. Cl.
CPC .................. *B64F 1/24* (2013.01); *B08B 7/00* (2013.01); *B60L 53/14* (2019.02); *B60L 53/35* (2019.02); *B60L 53/60* (2019.02); *B64C 25/32* (2013.01); *B64C 39/024* (2013.01); *B64F 1/22* (2013.01); *B64F 1/228* (2013.01); *B60L 53/66* (2019.02); *B64C 2201/08* (2013.01); *B64C 2201/088* (2013.01); *B64C 2201/18* (2013.01); *B64C 2201/20* (2013.01); *B64C 2201/201* (2013.01); *B64F 1/362* (2013.01)

(58) Field of Classification Search
CPC .......... B64C 2201/08; B64C 2201/088; B64C 2201/18; B64C 2201/20; B64C 2201/201; B64C 2201/206; B64C 25/32; B64C 39/024; B64F 1/24; B64F 1/228; B64F 1/22; B64F 1/362; B60L 53/14; B60L 53/60; B60L 53/35; B60L 53/66; B08B 7/00
See application file for complete search history.

(56) References Cited

U.S. PATENT DOCUMENTS

| | | | | |
|---|---|---|---|---|
| 2,610,366 A | * | 9/1952 | McKee | ..................... E06B 3/01 49/203 |
| 9,387,940 B2 | * | 7/2016 | Godzdanker | ........... B64F 1/125 |
| 9,561,871 B2 | * | 2/2017 | Sugumaran | ............. B64C 25/32 |
| 9,672,483 B2 | * | 6/2017 | Chae | ................... G06F 16/3344 |

(Continued)

*Primary Examiner* — Timothy D Collins
*Assistant Examiner* — Chunhong Zhang
(74) *Attorney, Agent, or Firm* — Sheppard, Mullin, Richter & Hampton LLP

(57) ABSTRACT

A landing platform control system and methods used for refuel or recharge purposes by a fleet of unmanned aerial vehicles (UAVs) performing aerial surveys are disclosed. The system can include a plurality of landing platforms positioned at predetermined locations within the area of interest, each landing platform comprising a mount connecting the landing platform to a surface, a mount component for coupling a floor, a floor to support a UAV while docked at the landing platform, a cover enclosing the floor; a battery charger; and a communications interface. The floor can be rotated to clear any accumulated debris. The cover can be coupled to the floor. The cover can alternate between open and closed position via rotating along the same axis as the floor.

24 Claims, 8 Drawing Sheets

(56) References Cited

U.S. PATENT DOCUMENTS

| | | | | |
|---|---|---|---|---|
| 2006/0249622 | A1* | 11/2006 | Steele | B64F 1/02 |
| | | | | 244/115 |
| 2017/0021942 | A1* | 1/2017 | Fisher | B64C 29/02 |
| 2017/0139409 | A1* | 5/2017 | Clarke | B64C 39/024 |
| 2017/0225801 | A1* | 8/2017 | Bennett | B64F 1/222 |
| 2018/0141680 | A1* | 5/2018 | Heinonen | B64F 1/12 |

* cited by examiner

SYSTEM AND METHODS FOR AIRCRAFT LANDING PLATFORM CONTROL

TECHNICAL FIELD

The disclosed technology relates generally to aerial vehicle landing platforms, and more particularly, some embodiments relate to enhanced-feature platforms for unmanned aerial vehicles.

DESCRIPTION OF THE RELATED ART

Aerial vehicles such as unmanned aerial vehicles (UAVs) can be used conduct aerial-survey operations including, for example, exploration, observation, investigation, inspection and monitoring of ground-based systems or areas for military and civilian applications. Aerial surveys can include, for example, operations such as crop mapping; inspection of power, gas, and rail lines; reconnaissance operations; area or event monitoring, and other infrastructure inspection and monitoring for determined areas of responsibility.

UAV flights are typically controlled by computer or by a navigator or pilot at a remote location. For example, the pilot can control the aircraft from a command center on the ground or even from another vehicle. During their flights, UAVs may collect data, carry a payload and/or perform additional functions. Collected data may need to be transferred to the command center prior to the conclusion of a fight mission.

A UAV may be powered by an on-board rechargeable battery. In some instances, a UAV may need to travel a distance that will exceed the available charge on the on-board battery. This may severely limit the range and utility of the UAV.

BRIEF SUMMARY OF EMBODIMENTS

According to various embodiments of the disclosed technology, systems and methods can be provided to control and monitor landing platforms used for refuel or recharge purposes by a fleet of unmanned aerial vehicles (UAVs) performing aerial operations or surveys, such as aerial infrastructure inspection and monitoring. In various embodiments, a fleet of multiple autonomous, or relatively highly automated UAVs can be configured so that each UAV in the fleet is configured to conduct an aerial survey of its respective defined area of responsibility. More particularly, the particular path computed during individual flight missions can take into account the location of landing platforms thus maximizing the covered territory by each UAV in the fleet.

In further embodiments, the system and methods for controlling the landing platform are disclosed. The system can include a plurality of landing platforms positioned at predetermined locations within the area of interest, each landing platform comprising a mount connecting the landing platform to a surface, a floor to support a UAV while docked at the landing platform, a mount component for coupling a holding floor, a cover enclosing the holding floor; a battery charger; and a communications interface; a plurality of UAVs distributed among the plurality of landing platforms.

In further embodiments, the landing platform can include a cover to protect the aircraft from the elements or from vandals after landing. In some embodiments, the cover can be half-barrel or dome shaped to provide a weatherproof or whether-shielded housing to shield the UAV and equipment from the environment.

In further embodiments, the holding floor is configured to provide a support platform for the UAV. The holding floor can comprise a top surface and a bottom surface. Each of the surfaces of the floor can be implemented to include a multitude of conductive surfaces with positive and negative polarities arranged in a determined pattern such that when the UAV is parked on the floor corresponding conductors on the docking elements (e.g., feet) of the UAV make the appropriate electrical contact. The floor can contain structural elements and be composed of such a material so as to provide a weatherproof and/or weather-resistant platform to support the UAV and equipment. The floor can include circuitry to support a number of sensors configured to detect the presence of debris, elements, or undesirable objects within the floor. The information generated by the sensors may show environmental information around the landing platform. Debris sensors can be configured to include debris sensing elements configured to generate and/or transmit signals.

In further embodiments, the mount can be configured to provide support to the landing platform by connecting the landing platform to a surface. For example, a surface to which landing platform is connected can be a roof of a building, a pole or tower, a tree, a bridge or other man-made structure, or any such element that would be suitable for placement of the landing platform. The mount can couple to the holding floor via a mount component. The mount component can include a coupling mechanism, which can further include a motor driving the coupling mechanism. The motor of the coupling mechanism can be actuated to effectuate rotation of the floor about a fixed axis. Each 90° rotation of the floor about a fixed axis can change position of the floor such that floor can be in a horizontal or a vertical position. By rotating the floor of the landing platform, any debris accumulated on the floor as a result of the floor being uncovered during UAV landing, including unresponsive UAVs can fall away from the floor. This allows for a faster, cheaper, and more reliable maintenance of the landing platforms by reducing the need for a service technician to perform the debris clearing function manually.

In further embodiments, the cover can be coupled to the landing floor. The coupling of the cover to the floor can be achieved via the coupling mechanism of mount component or via a separate coupling mechanism. The motor of the coupling mechanism of the mount component can be actuated to effectuate rotation of the cover. In some embodiments, this rotation is about the same axis as floor's axis of rotation. Thus, both the cover and the floor can rotate about the same axis. Each 90° rotation of the cover about a fixed axis can change position of the cover such that the cover can be in a closed position (i.e., when the cover is covering the floor), an open position (i.e., when the cover is rotated 180° from the closed position), and a side holding position (i.e., when the cover is rotated 90° or 270° from the closed position).

In further embodiments, the simultaneous rotation of the cover and the floor during the last quarter turn of the cover can be performed by a single motor via a single cam mechanism. Reducing the number of moving and electrical parts greatly increases system performance while keeping maintenance and cost low.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices, systems, and methods that provide an aircraft landing platform ("landing platform") and a control and maintenance scheme for an interaction between an aerial vehicle and the landing platform. Aerial vehicles may include an unmanned aerial vehicle (UAV) or any other type of movable object. The interaction between the UAV and the landing platform may include landing the UAV onto the landing platform, docking between the UAV and the landing platform for purposes of UAV refueling or recharging, UAV data transmission, and/or other interactions. The UAV may detect the landing platform and may discern if the platform is available for landing. The UAV may form wireless and/or wired connections with the landing platform while docked with the platform. The landing platform may have a cover that can protect the docked UAV and/or the landing platform when it is not in use by the UAV. According to various embodiments of the disclosed technology, the present disclosure can be provided to support a conduct of aerial surveys, such as aerial infrastructure inspection and monitoring, using a fleet of UAVs to perform missions along designated flightpaths.

Figure 1:
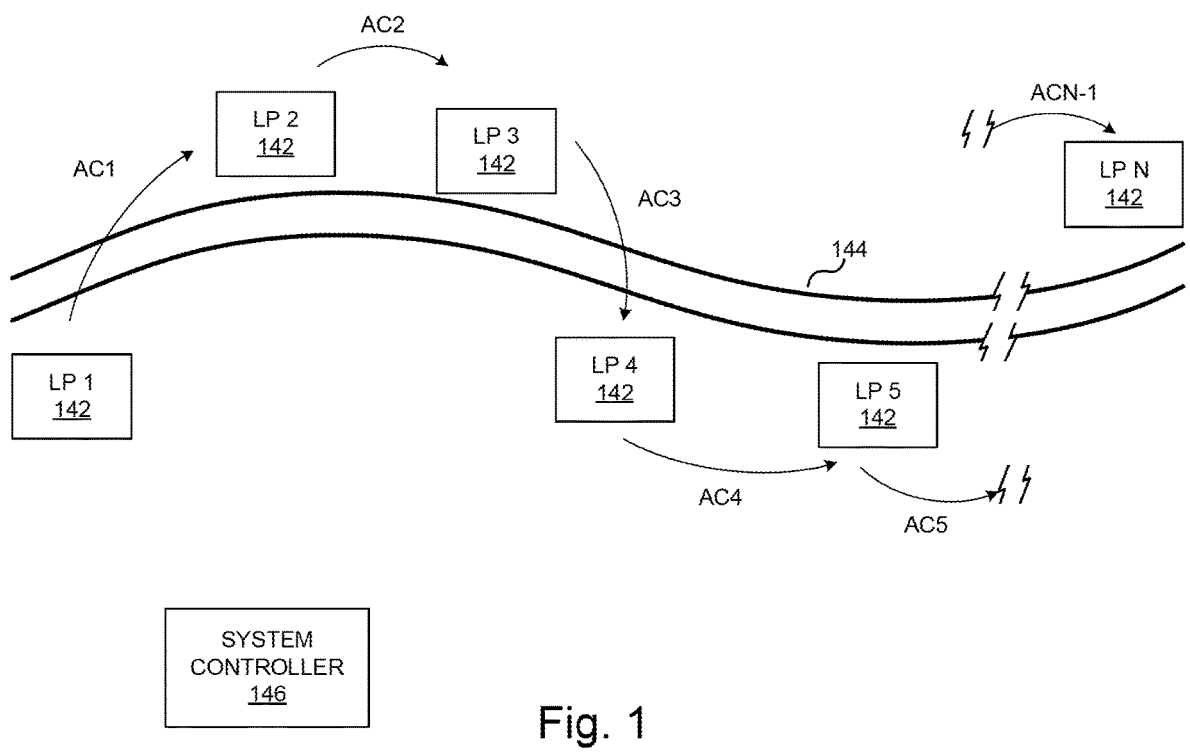
FIG. 1 is a diagram illustrating an example implementation of an automated fleet of small, unmanned aerial vehicles for aerial surveys in accordance with one embodiment of the systems and methods described herein.

FIG. 1 is a diagram illustrating an example implementation of an automated fleet of small, unmanned aerial vehicles for aerial surveys. In particular, the example disclosed in FIG. 1 includes a network of UAVs, AC1-ACN-1, and a plurality of N ground elements or landing platforms 142 to support the network of UAVs. Further in this example, landing platforms 142 are distributed about the linear infrastructure element, which as noted above in this example is assumed to be a rail line 144.

Also shown in the example of FIG. 1 is a system controller 146, which can be a central system controller such as, for example, a server system located at a base of operations to control the operation of the network of landing platforms and/or UAVs. In other embodiments, system controller 146 can be a distributed system of controllers to provide this operational control. System controller 146 can include hard wired and wireless communications to allow remote control of landing platforms, UAVs in the fleet as well as to exchange $C^3$ (Command, Control and Communications) information, telemetry and other data and information with the landing platforms or the UAVs (either directly or by way of a communication relay through landing platforms). For example, the system controller can be configured to download mission parameters and other mission information to the UAVs, provide remote control for UAV flight operations, receive telemetry from the UAVs, retrieve data gathered by the UAVs during their flight missions, provide software or other updates to the UAVs and the landing platforms, and otherwise exchange other information with the landing platforms and UAVs, provide remote control for landing platforms operations, including opening landing platform cover, closing landing platform cover, rotating landing platform to clear any debris or an unresponsive UAV, monitor individual landing platform use, receive maintenance notifications informing of individual components within landing platforms being compromised, receive notifications of debris or unresponsive UAVs present on the landing platforms.

In this example, assume that it is desired to inspect rail line 144 on a periodic basis using aircraft flying along the rail line so that a visual and a non-visual sensor-aided inspection can be made. In various embodiments and as shown in the diagram, landing platforms 142 are distributed at spaced-apart intervals along the rail line 144. Landing platforms 142 are populated with one or more UAVs in each station so that the aircraft can be staged from their respective landing platforms 142 for a given mission.

When a survey mission is initiated, an aerial vehicle leaves its landing platform 142, flies in a pattern (e.g., preprogrammed as part of a mission or controlled in real-time based on what is discovered during flight) within its range of its landing platform 142, gathers data using its sensor package, and returns to its landing platform for recharging or refueling. Accordingly, in this configuration, UAVs AC can remain stationed at their respective landing platforms and perform out-and-back missions without landing at a different landing platform.

In other embodiments, the UAVs can conduct a survey missions while flying from one landing platform to the next along the infrastructure element. For example, when a mission is initiated, an aerial vehicle leaves its landing platform 142, flies along its intended route to gather data, and terminates its mission at the next landing platform 142. For example, in the illustrated example UAV AC1 is staged at LP 1, departs LP 1 upon initiation of the mission to inspect the rail line 144 between LP 1 and LP 2 and terminates the mission at LP 2. Upon docking, the UAV AC1 can be refueled or recharged at LP 2 landing platform 142 and it can also download image data and other sensor data for review and inspection. For the next mission, the UAV may be programmed to return to its original landing platform 142 (e.g., UAV AC1 surveys the sector between LP 1 and LP 2 and returns to LP 1) at the conclusion of its mission. Alternatively, for the next mission, the UAV may be programmed to continue surveying another sector (e.g., the next adjacent sector) down the line. For example, UAV AC1 may depart LP 2 and survey the sector between LP 2 and LP 3 and terminates its mission at LP 3.

As also shown in the example of FIG. 1, the other aircraft in the fleet staged at their respective landing platforms 142 are also deployed to inspect the rail line 144 each between their respective initiating and terminating landing platforms 142. That is UAV AC2 is staged at LP 2, inspects the rail line 144 between LP 2 and LP 3 and terminates the mission at Dock 3 and so on until the last segment of the rail line in this survey is inspected by UAV AVN-1 which departs from dock N-1 and terminates at Dock N. In various embodiments, UAVs AC1 through AVN-1 can be deployed one at a time in a serial fashion or some or all of them can be deployed simultaneously to perform their inspections. Once all of the UAVs AC1 through AVN-1 have made flight from their respective initiating to their terminating landing platforms 142, the entire infrastructure element between LP 1 and LP N has been surveyed.

For a subsequent survey, the mission can be flown in reverse such that each UAV flies the mission from its current landing platforms (where the last mission terminated) to its original initiating landing platform. In this way, each UAV can be dedicated to survey particular sector of the infrastructure element between two landing platforms 142. This can be advantageous in situations where different UAV requirements may be specified for different sectors of the infrastructure element to be surveyed. For example, different sectors of the infrastructure element may be at altitudes that are sufficiently different from one another that it would be advantageous to have different aircraft configured to handle the unique altitude requirements. As another example, different sectors of the infrastructure element may have different inspection and monitoring requirements such that different sensor packages can be included for the aircraft in different sectors.

As noted above, in some configurations, after the rail-line survey is complete, the direction of travel can be reversed for the next survey. In other configurations, additional UAVs can be stationed at the system entry point (e.g., LP 1) and the next survey completed in the same direction with the UAVs continuing to hop down the line from one landing platforms 142 to the next for each survey. As this example serves to illustrate, a fleet of UAVs can be used to inspect a rail line or other linear infrastructure element by sequentially hopping from one landing platform to the next and performing sensor operations to gather sensor data. Although the example described above illustrates a sequential hopping from one end of the infrastructure element to the other, alternative flight arrangements between landing platforms can be configured.

Figure 2:
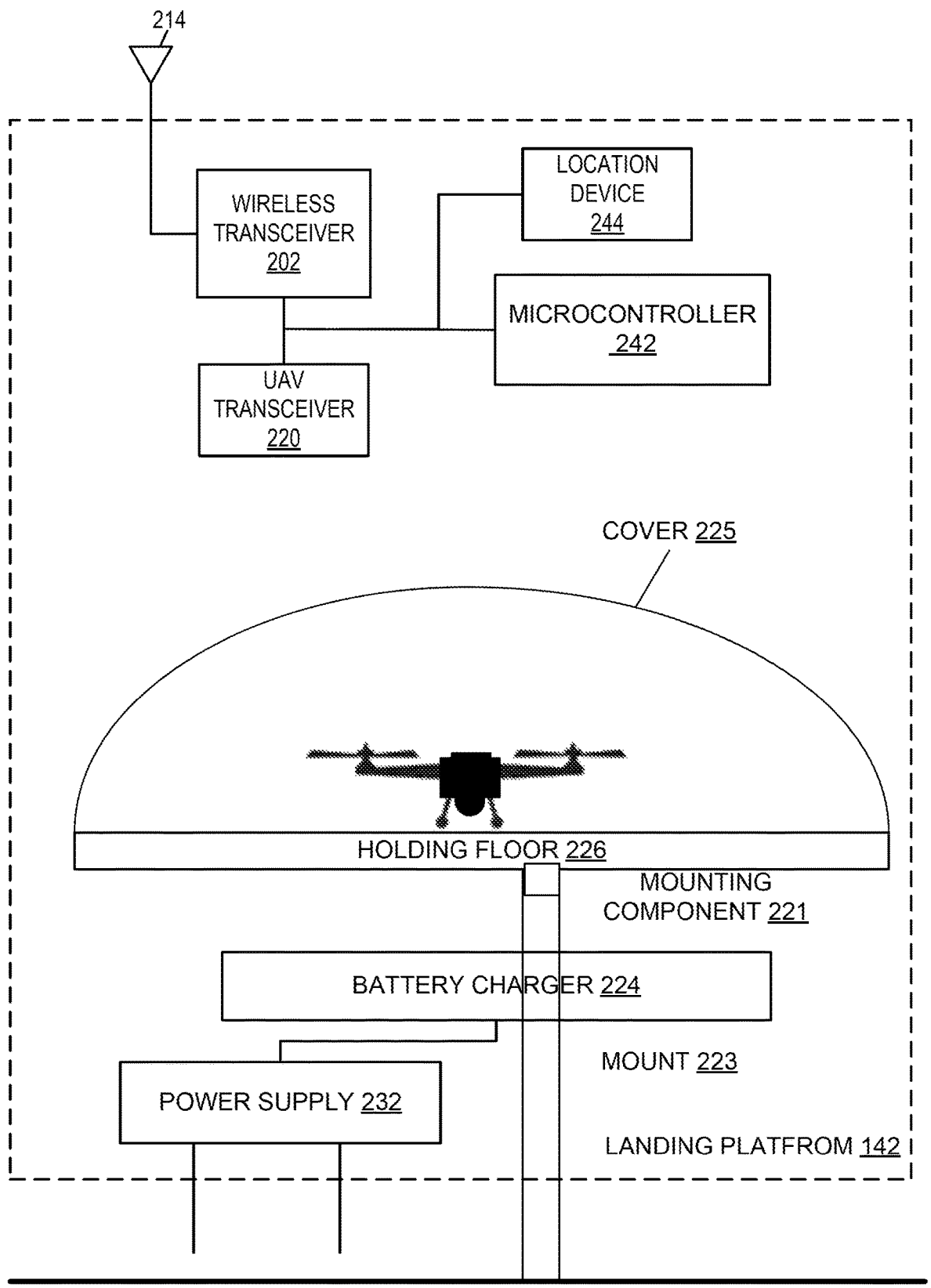
FIG. 2 is diagram illustrating an example of a landing platform in accordance with one embodiment of the technology described herein.

FIG. 2 is a diagram illustrating an example of a landing platforms 142 in accordance with one embodiment of the technology described herein. Referring now to FIG. 2, this example includes communications capability and battery charging capability, and can also be configured to provide support, shelter and security for a docked UAV.

A floor 226 is configured to provide a support platform for the UAV. Floor 226 can be appropriately sized for a single UAV or it can be large enough for multiple UAVs. Additionally, in other embodiments, multiple floors can be provided within a single landing platform. Accordingly, landing platforms 142 can be configured to contain or support multiple UAVs.

Floor 226 can comprise a top surface and a bottom surface. Each of the surfaces of floor 226 can be implemented to include a multitude of conductive surfaces with positive and negative polarities arranged in a determined pattern such that when the UAV is landed on floor 226 corresponding conductors on the docking elements (e.g. feet) of the UAV make the appropriate electrical contact. The determined pattern for these conductive surfaces on the platform can include, for example, a checkerboard pattern. The pattern can be sized and configured such that when one foot of the UAV is on a pattern element of a given polarity, the opposite foot of the UAV will be positioned on a pattern element of the other polarity. Lnsulative spacing between the pattern elements can be large enough such that a foot of the UAV cannot cause a short between adjacent pattern elements of opposite polarities.

Floor 226 can contain structural elements and be composed of such a material so as to provide a weatherproof and/or weather-resistant platform to support the UAV and equipment. For example, cover 225 can include drainage holes, sloped edges to ensure precipitations do not pool on floor 226. Similarly, floor 226 can be composed of weather and rust resistant material such as polycarbonate, rubber, or other such material.

Floor 226 can include circuitry to support a number of sensors configured to detect presence of debris, elements, or undesirable objects within floor 226. For example, sensors may include a debris sensor, a pressure sensor, a humidity sensor, a force sensor, a light sensor, a gas concentration sensor, a magnetic or electrical field sensor, a conductivity sensor, or another other suitable sensor. The information generated by the sensors may show environmental information around the landing platform 142. For example, environmental conditions, such as temperature, wind speed and/or direction, sunniness, precipitation, or air pressure may be shown.

Debris sensors can be configured to include debris sensing elements configured to generate and/or transmit signals. Landing platform 142 may be configured to include a user directed response or an automated response to signals generated by the debris sensing sensors. The user directed response or automated response may include an activation of the rotation mechanism designed to rid floor 226 of accumulated debris. In some implementations, floor 226 may include cleaning apparatus configured to remove debris from floor 226. For example, a cleaning apparatus may include a vacuum, a mechanically operated brush or sweeper or other cleaning apparatus. The cleaning apparatus may be activated by the signal generated by the debris sensor.

A mount 223 is provided to provide support the landing platform 142 by connecting landing platform 142 to a surface 251 to which landing platform 142 is connected. For example, a surface to which landing platform 142 is connected can be a roof of a building, a pole, or any surface that would be suitable for placement of landing platform 142. As another example, poles, platforms, towers, bridges, water towers, or other structures typically present with the infrastructure element (e.g., power poles, light poles, antenna platforms, signal poles, and so on) can also be modified or configured to provide structural support for landing platforms 142.

Mount 223 can be configured as a rod construction of a certain height. Height of mount 223 may be fixed and be appropriately sized to accommodate access of UAV to the landing platform 142, rotation of floor 226, rotation of cover 225, debris clearance from floor 226 and/or other functions of landing platform 142. For example, mount 223 connected to a roof of a building may be of such height as to provide an unobstructed access to landing platform 142. Obstructions can include objects located at or near location of mount 223 that can hinder UAV's access. In certain embodiments, the height of mount 223 may be adjustable. For example, a mount supporting a landing platform on top a building roof may be raised in response to a debris accumulated on the building roof hindering UAV's access.

Figure 3:
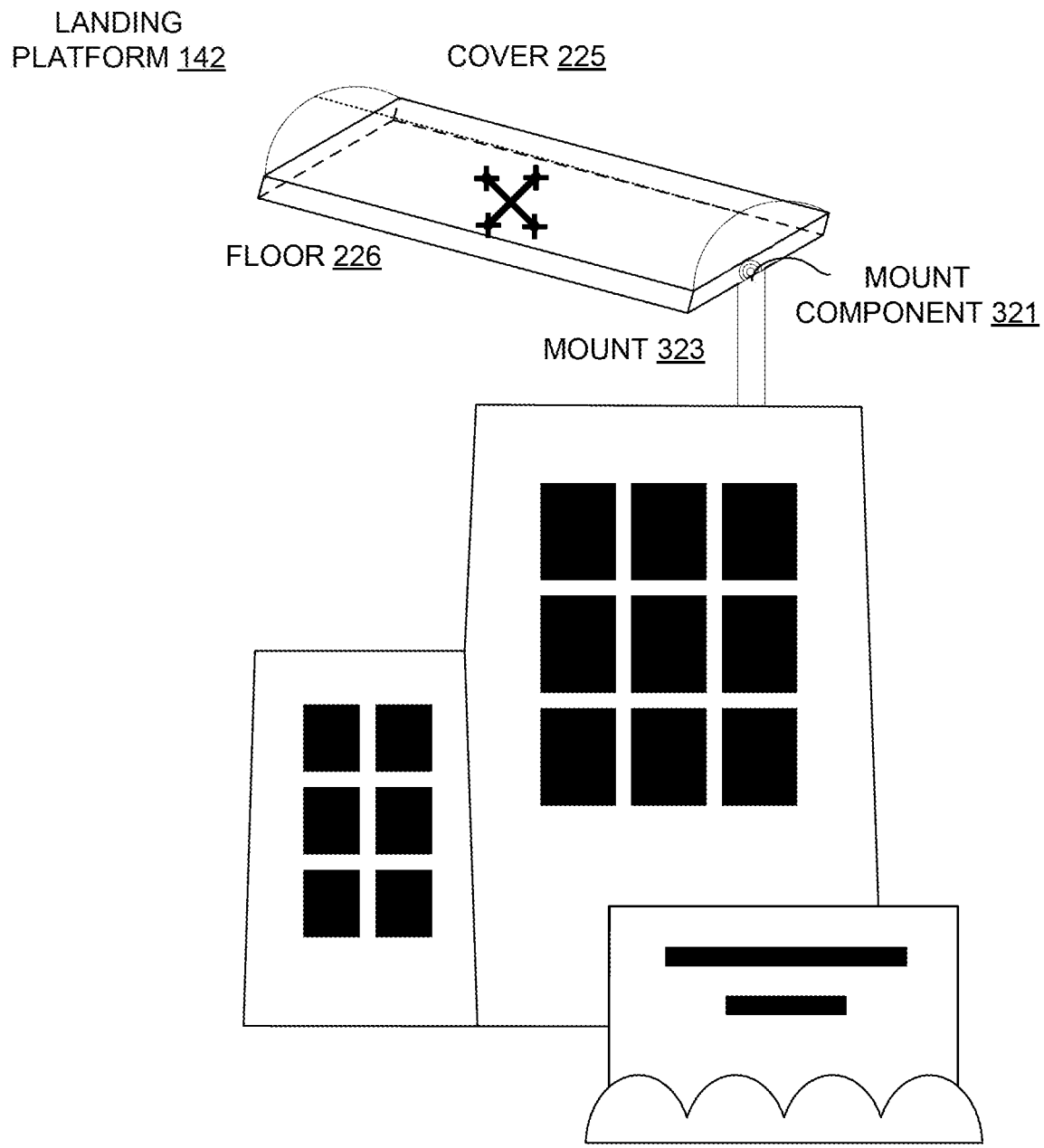
FIG. 3 is a diagram illustrating an example of a single-mount landing platform in accordance with one embodiment of the technology described herein.

Mount 223 can couple floor 226 via a mount component 221 on one of the sides of floor 226. For example, FIG. 3 depicts an exemplary landing platform 142 with single mount 323 coupling floor 226 via mount component 321. Cover 225 is mounted to floor 226. Referring back to FIG. 2, mount component 221 can include a coupling mechanism, a motor driving the coupling mechanism, and/or other components. The coupling mechanism can include sleeve coupling, box coupling, flexible coupling, beam coupling, and/or other coupling mechanism. The motor of the coupling mechanism can be actuated to effectuate rotation of the floor about a fixed axis. Each 90° rotation of floor 226 about a fixed axis can change position of floor 226 such that floor can be in a horizontal position (i.e., when floor 226 is parallel to surface 251) or a vertical position (i.e., when floor 226 is perpendicular to surface 251).

Figure 4:
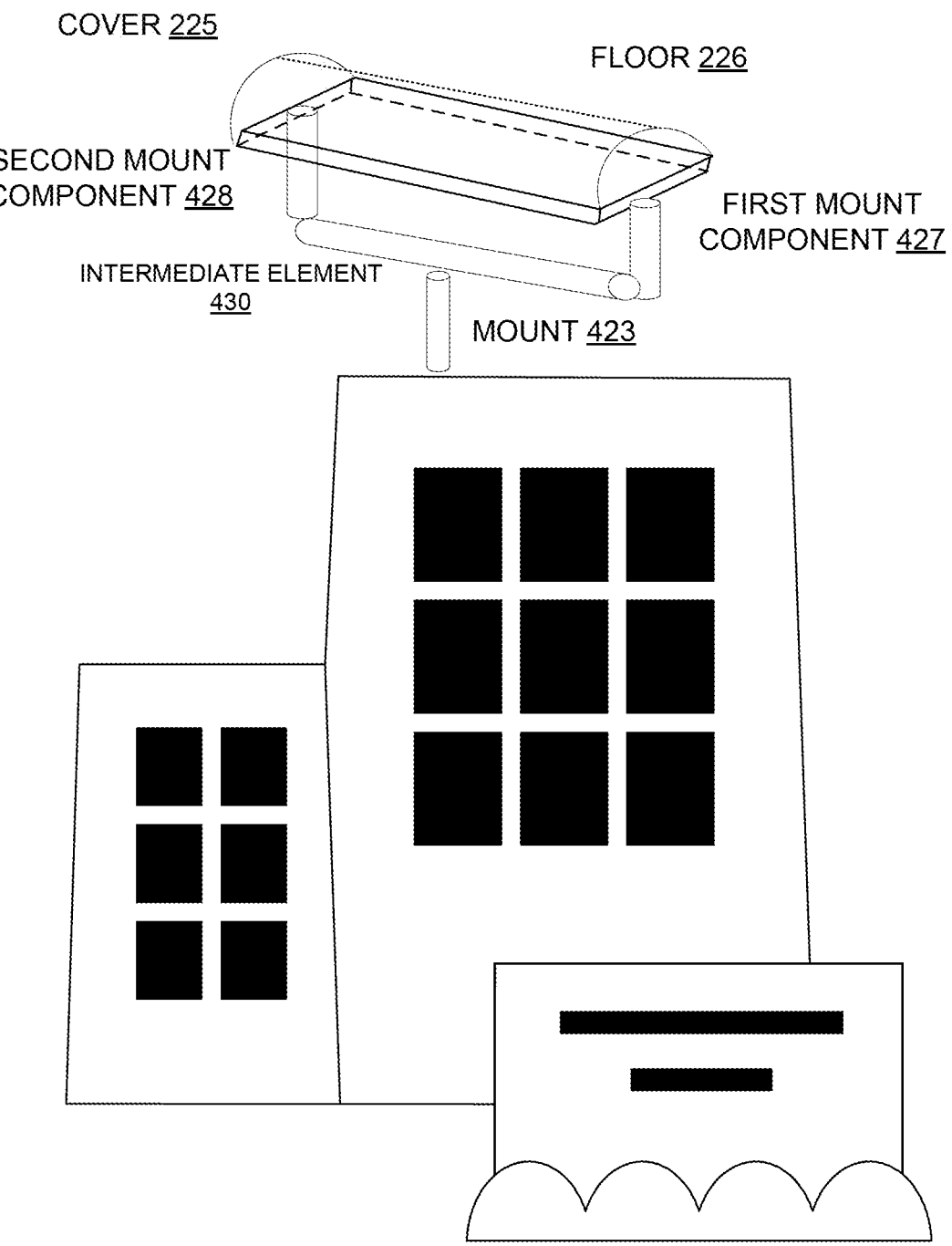
FIG. 4 is a diagram illustrating an example of a double-mount landing platform in accordance with one embodiment of the technology described herein.

In certain embodiments, mount 223 can couple floor 226 via two mount components located on opposite sides of floor 226. Mount 223 coupled to floor 226 on both floor sides can include an intermediate element connecting two mount components. The intermediate element can be placed lower than floor 226 at a distance required to accommodate rotation of floor 226 and/or cover 225. In certain embodiments, mount 223 can be configured as having two individual mount structures on opposite sides of floor 226. For example, FIG. 4 depicts an exemplary landing platform 142 with mount 423 coupling floor 226 via first mount component 427 and second mount component 428, each connected to an intermediate element 430. Intermediate element 430 further connects to mount 423. The space between intermediate element 430 and floor 226 is dimensioned to accommodate floor 226 in a vertical position and cover 225 in an open position.

Referring again to FIG. 2, landing platform 142 may be configured such that when floor 226 is in the horizontal position, either the top surface or the bottom surface can serve as the landing surface. Landing platform 142 may be configured to rotate between the top and bottom surface in the event that one of the surfaces is not functioning and/or is unresponsive. Accordingly, in some embodiments both the top and bottom surfaces can include features such as the charging elements, sensors and cleaning apparatus. This can be useful for example in the event of a fault in the charging elements, sensors, cleaning apparatus or other features. If there is a fault in one or more of these features on one surface, the platform can be rotated such that the opposite surface is oriented in the upward direction to support aircraft. In other embodiments, landing platform 142 may be configured such that only the top surface has one or more of these features, as described herein. However, such embodiments may still be configured such that the bottom surface can be used as a landing platform even if features such as charging features or sensors are not available for this surface.

As noted, landing platform 142 may be configured such that floor 226 can be rotated to the vertical position (i.e. perpendicular to surface 251), the opposite horizontal position, or some other non-horizontal position. Such positions in which debris including dust, leaves, birds, rocks, an and/or unresponsive UAV or other objects accumulated on floor 226 can fall away from the floor. This may be referred to herein for purposes of description as a debris-clearing position.

Landing platform 142 can include a cover 225 to protect the aircraft from the elements or from vandals while docked. Cover 225 can be of such shape and made from such a material so as to provide a weatherproof or weather-shielded housing to shield the UAV and equipment from the environment. For example, cover 225 can be half-barrel or dome shaped to ensure precipitation does not pool on top of cover 225. Similarly, cover 225 can be composed of weather and rust resistant material such as polycarbonate, stainless steel or other such material. Cover 225 can be configured to fully and/or partially open for takeoff and landing operations and to be closed at all other times to secure the aircraft inside, to secure the other equipment within cover 225, as well as to protect floor 226 of landing platform 142 from debris, elements, and any other undesirable objects. For example, closing cover 225 can prevent birds, insects, and other objects from landing on floor 226. Cover 225 can close subsequent to a UAV docking at landing platform 142. In some implementations, cover 225 can include aircraft bay doors to allow cover 225 to be closed even for takeoff and landing operations as well as at all other times to secure the aircraft and other equipment within cover 225.

Cover 225 can be coupled to landing floor 226. The coupling of cover 225 to floor 226 can be achieved via the coupling mechanism of mount component 221. The motor of the coupling mechanism of mount component 221 can be actuated to effectuate rotation of cover 225 about the same fixed axis as floor 226. Thus, both cover 225 and floor 226 can rotate about the same axis. Each 90° rotation of cover 225 about a fixed axis can change position of cover 225 such that cover 225 can be in a closed position (i.e., when cover 225 is covering floor 226), an open position (i.e., when cover 225 is rotated 180° from the closed position), and a side holding position (i.e., when cover 225 is rotated 90° or 270° from the closed position).

In some implementations, cover 225 can be mounted to floor 226 via a bracket, a hinge, and/or other mechanism that allows cover 225 to alternate between open and closed positions. Cover 225 can be mounted directly to mount 223. Alternatively, cover 225 may be configured such that the movement between open and closed positions can be achieved by way of retracting, folding, sliding or otherwise removing cover 225. Cover 225 can enclose floor 226 such that a space between floor 226 and cover 225 can accommodate one or more UAV docked on landing floor 226, as well as instruments, communications equipment or other devices that may be accommodated within.

Cover 225 can be rotationally coupled with the floor 226 through a single drive mechanism (e.g., a single motor and cam or gearing mechanism). Accordingly, in some embodiments a single motor (or combination of motors in a single drive mechanism) can be used to drive both cover 225 and floor 226, without requiring a separate drive mechanism for each. For example, the motor and gearing mechanism can be used to drive rotation of cover 225 which in turn can selectively cause rotation of floor 226 through the desired orientations or vice versa.

Figure 5A:
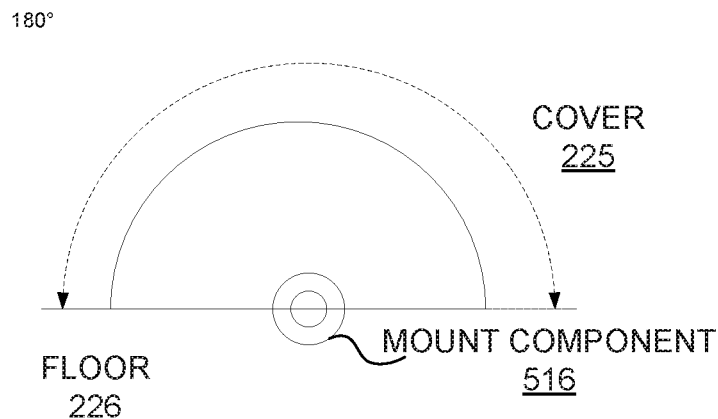
FIG. 5A is a diagram illustrating an example in which of a cover of a landing platform is closed in accordance with one embodiment of the technology described herein.
Figure 5B:
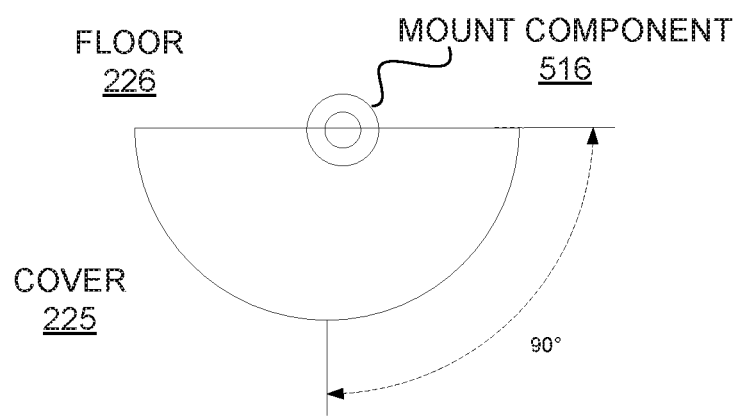
FIG. 5B is a diagram illustrating an example in which of a cover of a landing platform is rotated to an open position in accordance with one embodiment of the technology described herein.
Figure 5C:
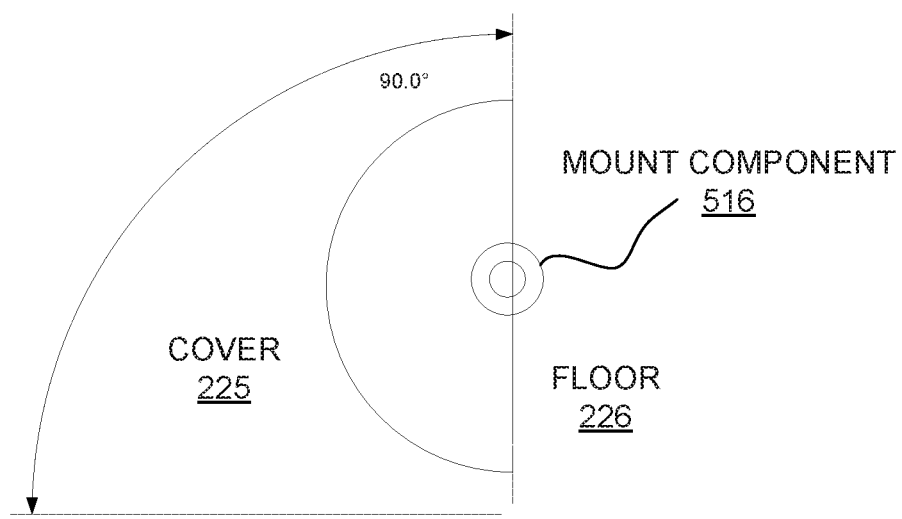
FIG. 5C is a diagram illustrating an example in which of a cover of a landing platform is rotated to a debris clearing position and a floor of is rotated to a vertical position in accordance with one embodiment of the technology described herein.

A more specific example of this is illustrated in FIGS. 5A-5C. In FIG. 5A, landing platform 142 is shown with cover 225 in a closed position. Cover 225 encloses floor 226 to which it is coupled via mount component 516 of mount 512. In this example, the drive mechanism can be configured to rotate cover 225 from the closed position as shown in FIG. 5A to a fully open position at 180° of rotation as shown in FIG. 5B. In this position, cover 225 is in an open position and floor 226 ready to accept a UAV for landing. As seen in this example, the platform can be configured such that floor 226 does not rotate while the cover rotates 180° from the closed position to the fully open position.

As shown in FIG. 5C, the drive mechanism can be configured to cause a further rotation of cover 225 by 90° from the fully open position to a vertical position. Tabs, extensions or other structures can be provided on cover 225 (trailing based on direction of rotation) to engage complementary structures on floor 226 to cause floor 226 to rotate from its horizontal position to the vertical position as also shown in FIG. 5C.

After the debris is cleared, the drive mechanism causes cover 225 to rotate from the vertical position in FIG. 5C back to the horizontal position (FIG. 5B). Tabs extensions or other structures can also be used to allow rotation of cover 225 to cause floor 226 to also rotate back to the horizontal position. The cover can then be closed, returning the structure to the configuration shown in FIG. 5A.

Rotation of cover 225 first opens the platform to allow a UAV to launch prior to the rotation of floor 226. The subsequent simultaneous rotation of both cover 225 and floor 226 can be achieved by using a single motor or drive mechanism. This can reduce a number of mechanical parts, lower the cost of the unit and the cost of repair and maintenance. This may also increase performance reliability and reduce the frequency of required manual inspections.

Figure 6:
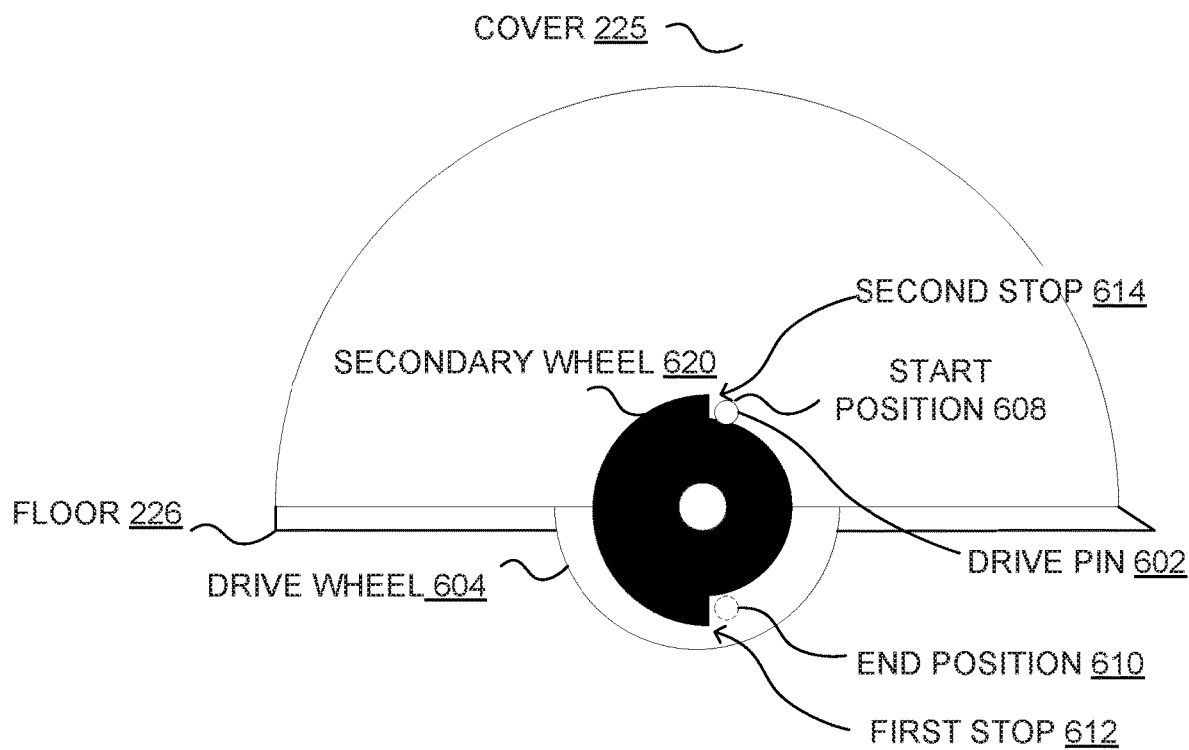
FIG. 6 is a diagram illustrating an example of a single drive mechanism in in accordance with one embodiment of the technology described herein.

FIG. 6 illustrates an exemplary single drive mechanism to drive both cover 225 and floor 226 without requiring a separate drive mechanism for each. More specifically, in this example a drive pin mechanism on cover 225 translates rotation of the cover into rotation of the floor via a secondary wheel driven by the drive pin. The rotational motion can be driven by utilizing a pin mechanism, such as, for example, a Geneva mechanism.

As seen in the example of FIG. 6, Drive pin 602 is positioned on a drive wheel 604, which is driven by a motorized mechanism. Drive pin 602 is connected to cover 225 (protrudes through cover 225 in the illustrated example) such that drive pin 602 rotates cover 225 with rotation of drive wheel 604. Drive pin 602 is positioned at a distance from the axis of rotation such that it follows an arcuate path. When drive wheel 604 is rotated to open the hood (clockwise in this example), drive pin 602 follows the arcuate path from a start position to an end position (608 and 610 in this example, but other orientations are permitted). Movement of drive pin 602 can cause opening of cover 225. At end position 610, drive pin 602 can engage secondary wheel 620 at a predetermined engagement site. In the illustrated example, drive pin engages first stop 612 of secondary wheel 620. Accordingly, movement of drive pin 602, and hence cover 225, by 180 degrees causes drive pin to reach approximately the position of first stop 612. Further rotation of drive wheel 604 (and hence drive pin 602 and cover 225) in a clockwise direction causes drive pin 602 to engage first stop 612. This causes secondary wheel 620, and floor 226 to which it is fixedly connected, to rotate with the rotation of drive wheel 604. Rotating drive wheel another 90° beyond the first 180° rotation, for example, brings cover 225 and floor 226 into the vertical position as seen in FIG. 5C.

Rotation 180° counter-clockwise from the vertical position allows cover 225 to close and brings drive pin 602 back adjacent to second stop 614. Further counter-clockwise rotation by 90° brings the full assembly back to the horizontal and closed position. Thus, this or other more conventional forms of a Geneva mechanism can be used for selective rotation of floor 226 in response to rotation of cover 225.

Referring again to FIG. 2, an inductive or other wireless battery charger 224 can be included to charge the batteries of the UAV while it is docked on the holding floor 226. Wireless battery charger 224 can include any of a number of different wireless charging techniques including, for example, inductive chargers using coils to induce current in a corresponding coil in the UAV. As another example, battery charger 224 can include a low-frequency electromagnetic radiation source that transmits its energy to a power-harvesting circuit in the UAV.

Alternatively, wired connections can be made with the UAV by docking the UAV on floor 226 such that electrical contacts on the UAV lineup with and connect to corresponding electrical contacts on platform 226.

A power supply 232 can be included to provide power to battery charger 224 as well as to the communications equipment (described below). In some embodiments, power supply 232 can be a dedicated power supply for the UAV equipment. In other embodiments, power supply 232 can be an existing power supply used to provide power to other components of the landing platform. For example, where the landing platform is part of the control box used for signaling controls on a rail line, power supply 232 can be the power supply used to supply power to the signals or other instrumentalities associated with that railroad control box. Power supply 232 can include the appropriate AC to AC, AC to DC, DC to AC, or DC to DC power conversion needed to supply the appropriate power to the various devices.

In the example of FIG. 2, landing platform 142 also includes communications equipment, which in this example include a wireless transceiver 202 a UAV transceiver 220 and an antenna 214. UAV transceiver 220 can include a wireless transmitter and receiver to communicate with UAV via a wireless communication link. Any of a number of wireless communication protocols can be used for the communication link between UAV transceiver 220 and the UAV. The MAC and PHY layers of the communication link between UAV transceiver 220 and the UAV can be configured to allow communications dedicated to a particular one of the plurality of UAVs in the landing platform 142. This can allow dedicated or specific communication links with individual UAVs. Accordingly, UAV-specific communications can take place. This can allow, for example, mission-specific data to be loaded into a particular UAV. Although not shown, UAV transceiver 220 can also include an antenna to facilitate the wireless communications.

Wireless transceiver 202 is configured to communicate between landing platform 142 and external entities such as, for example, a system controller 146 or other servers. For example, wireless transceiver 202 can be implemented using any of a number of wireless communication systems such as, for example, cellular communications. In other embodiments, hardwired communications can be provided to the landing platform.

Landing platform 142 can also include a microcontroller 242, which can include one or more processors and memory devices to control the operation of landing platform 142. This can be a dedicated controller to control the landing platform, UAV and mission operations, or a shared controller to also control other functions that might be unrelated to the UAV and its missions.

In some implementations, controller 146 may be configured to effectuate operation, maintenance, and control of landing platform 142 by facilitating interaction between users and landing platform 142. For example, controller 146 may be configured to include a user interface configured to display information received from landing platform 142 as well as to receive user input from the user. By way of non-limiting example, landing platform information and user input may be viewed through a client application on the wireless communication device. An input device may include a key entry device, a touch entry device, an imaging device, a sound device, and/or other input devices.

The user interface may display information pertaining to landing platform 142. The For example, the landing platform information may include usage information, connectivity information, battery information, environmental information, information pertaining to individual components of landing platform 142, and/or other landing platform information. For example, if a malfunction has occurred on landing platform 142, such information notifying the user may be displayed. The user interface may display whether cover 225 is open or closed, whether floor 226 is rotated form horizontal to vertical position, whether the top or bottom surface is currently serving as the landing surface. The user interface may show whether the UAV is currently docked to landing platform 142.

Landing platform information may include environmental information around landing platform 142. For example, environmental conditions, such as temperature, wind speed and/or direction, sunniness, precipitation, or air pressure may be displayed. In some implementations, the user interface may show information based on data received from the UAV docked at landing platform 142. For example, if a camera of the UAV is capturing video, live streaming video may be shown on the user interface. The user interface may show information relating to the UAV, such as a state of the UAV. The user interface may display landing platform information in real-time or be updated periodically based on predetermined time parameter.

The user interface may also display user input components configured to receive user input for controlling landing platform 142. The received user input may include a selectable icon, a selectable command, a textual information, a textual command, a voice command, and/or other information that facilitates entry or selection of landing platform control information by the user. For example, a touchscreen may show one or more regions for a user to touch to provide user input components. The user input components may be displayed simultaneously with the landing platform information displayed on the user interface. For example, a user may input a command that may rotate floor 226 of landing platform 142. The information pertaining to the orientation of floor 226 displayed in real-time to the user interface. Thus, the user may be able to see the adjustment of landing platform responsive to the user's input in real-time.

In some embodiments, location assistance devices 244 can also be provided with the landing platform to assist the UAV in locating and recognizing the landing platform. For example, an IR beacon or a visual pattern generator can be used to provide information that can be recognized by the UAV to allow the UAV to home in on and locate landing platform 142. In further embodiments, GPS receivers can be used to allow the UAV to locate its intended landing platform 142. In some embodiments, differential GPS can be used to allow one GPS receiver (for example in the base station at a known location) to measure timing errors and provide correction information to the GPS receivers in the UAVs. This can allow timing errors to be eliminated, and can allow more accurate position determination by the UAV.

In some embodiments, landing platforms 142 can be dedicated stations intended solely to house the one or more UAVs and the associated equipment such as UAV battery chargers and communications equipment. In other embodiments, the landing platform can include a housing, cover, enclosure, or other components that provides shared utilization between the UAV and its associated equipment, and equipment or machinery associated with the survey area. For example, enclosures that house switching equipment, signaling equipment and other equipment on a rail line can be modified to accommodate a UAV platform and the associated UAV equipment. As another example, poles, platforms, towers or other structures typically present with the infrastructure element (e.g., power poles, light poles, antenna platforms, and so on) can also be modified or configured to include landing platforms 142. Landing platforms can also be located in portable facilities such as in a trailer, van or transportable storage pod, or they can be constructed as a more permanent structure.

Figure 7:
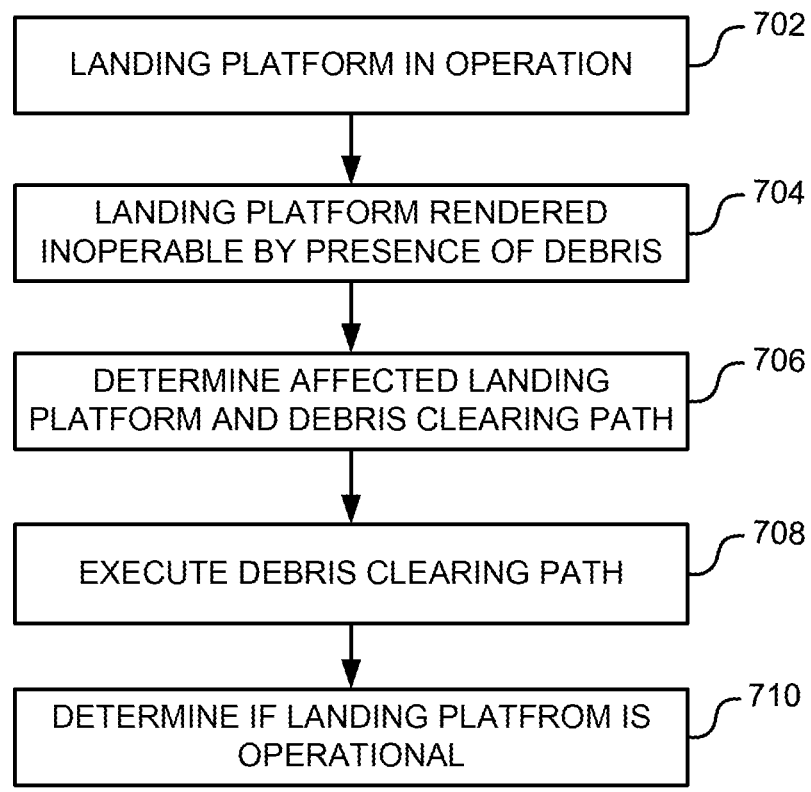
FIG. 7 is an operational flow diagram illustrating an example process for clearing debris off of a landing platform in accordance with one embodiment of the systems and methods described herein.
Figure 8:
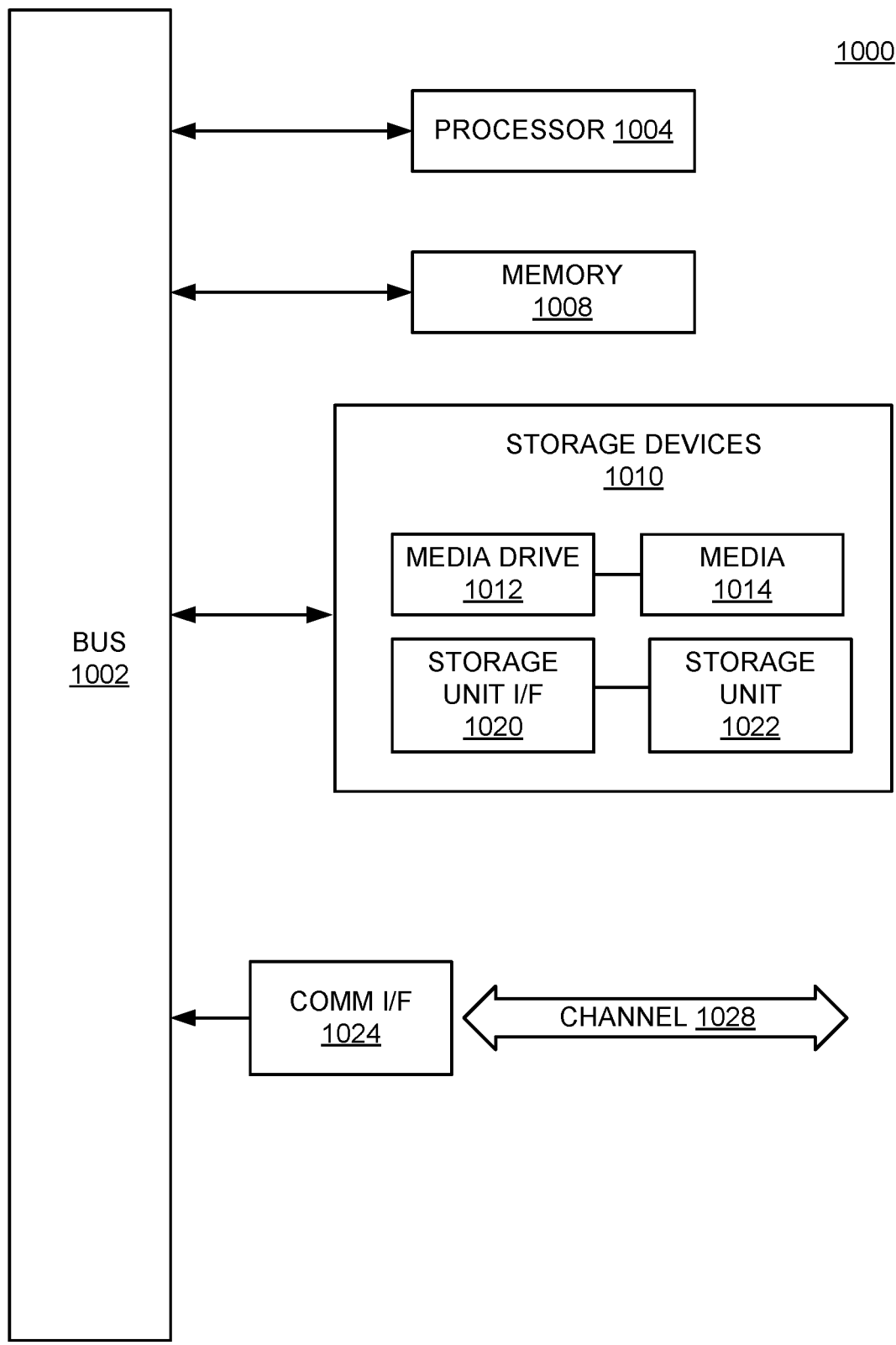
FIG. 8 illustrates an example computing module that may be used in implementing various features of embodiments of the disclosed technology.

FIG. 7 is an operational flow diagram illustrating a process for clearing debris from the landing platform. At operation 702, a landing platform is in operation in the environment shown in FIG. 1. At operation 704, assume a landing platform is rendered inoperable by debris. For purposes of illustration assume that a UAV expected to land on the landing platform is unable to land and leaves affected landing platform. At operation 706 the system controller 146 or other element in the system determines the affected landing platform and identifies the type of debris. For example, the landing platforms can be configured to transmit landing platform information to the system controller if debris is present on floor of the landing platform. Thus, in this example affected landing platform can send a notification to the system controller alerting it of the presence of debris accumulated as a result of a strong wind gusts in the area. At this time, the system controller can compute a path for clearing the debris (or paths can be precomputed or manually determined and entered into the system in advance or in real time). In this example, a cover of the affected landing platform is open. Accordingly, at operation 708, a rotational mechanism is engaged to rotate the a cover of the landing platform 90° from the open position to a debris clearing position. Next, the rotational mechanism engages a cam such that the rotation of the cover to a closed position causes a simultaneous rotation of a floor from a horizontal to a vertical position. This rotation causes the debris accumulated on the floor to fall off. And at operation 710, a determination is made whether the debris was cleared successfully and the landing platform may accept UAVs for landing and docking.

Where controllers are implemented in whole or in part using processors executing software, in one embodiment, these elements can be implemented as a processor capable of carrying out the functionality described with respect thereto. One such example processing unit is shown in FIG. 8. Various embodiments are described in terms of this example processing unit 1000. After reading this description, it will become apparent to a person skilled in the relevant art how to implement the technology using other processing configurations or architectures.

Referring now to FIG. 8, computing processor module 1000 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD or DVD drive (R or RW), or other removable or fixed media drive might be provided. Accordingly, storage media 1014 might include, for example, a hard disk, a floppy disk, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels. In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An aircraft landing platform, comprising:
a landing floor comprising a top surface;
a power source configured for providing power to the landing floor;
a mount comprising a drive mechanism configured for rotatably coupling the landing floor, the drive mechanism comprising a motor, wherein the motor is configured to rotate the landing floor about a fixed axis of rotation between the landing floor horizontal and vertical positions; and
a landing floor cover, the landing floor cover being rotatable between a closed position, in which the landing floor cover is covering the landing floor, and an open position;
wherein the landing floor cover is rotationally coupled with the landing floor by the mount, such that the drive mechanism is further configured to rotate the landing floor cover about the fixed axis of rotation between the closed position and the open position independently of the landing floor using the same drive mechanism.

2. The aircraft landing platform of claim 1, wherein the top surface comprises a conductive pattern comprising a plurality of conductive surfaces with positive and negative polarities arranged in a determined pattern configured for providing electrical contact with an aircraft's conductive landing gear.

3. The aircraft landing platform of claim 2, further comprising:
a receiver to receive aircraft sensor data while the aircraft's conductive landing gear is in electrical contact with the landing floor and to effectuate data transfer of the aircraft sensor data to an aircraft controller.

4. The aircraft landing platform of claim 1, wherein the drive mechanism further comprises a drive wheel coupled to the motor, and an actuating mechanism coupled to the drive wheel and configured to rotate the landing floor cover and the landing floor, the actuating mechanism comprising:
a cam connected to the landing floor and comprising a first stop and a second stop, the cam configured to rotate about the fixed axis of rotation;
a drive pin positioned on the drive wheel and connected to the landing floor cover such that the rotation of the drive wheel causes the landing floor cover to rotate between the closed position and the open position; and
wherein rotation of the drive wheel beyond a point where the drive pin engages the first stop of the cam simultaneously rotates the landing floor and the landing floor cover from the horizontal position to the vertical position.

5. The aircraft landing platform of claim 4, wherein the actuating mechanism is engaged responsive to the landing floor cover rotating from 180° to 270°.

6. The aircraft landing platform of claim 4, wherein rotation of the drive wheel such that the drive pin moves between the first stop of the cam and the second stop of the cam causes the landing floor cover to move between the open position and the closed position without causing the landing floor to rotate.

7. The aircraft landing platform of claim 1, wherein the landing floor cover comprises a half-pipe shaped cover.

8. The aircraft landing platform of claim 1, wherein the landing floor comprises a bottom surface with a conductive pattern configured for providing electrical contact with an aircraft's conductive landing gear.

9. The aircraft landing platform of claim 1, wherein a start of rotation of the landing floor cover is simultaneous with a stoppage of rotation of the landing floor.

10. The aircraft landing platform of claim 1, wherein a start of rotation of landing floor cover is prior to a start of rotation of the landing floor.

11. The aircraft landing platform of claim 1, further comprising a sensor configured to generate output signals conveying presence of debris detected on the landing floor.

12. The aircraft landing platform of claim 11, wherein the sensor is further configured to generate output signals conveying aircraft's conductive landing gear is in electrical contact with the landing floor.

13. The aircraft landing platform of claim 12, further comprising an aircraft landing platform controller comprising a processor and a transmitter communicatively coupled to the landing floor.

14. The aircraft landing platform of claim 13, further comprising a memory coupled to the processor and storing instructions, which when executed by the processor, cause the processor to perform the operations comprising:
   determining, based on the sensor output signals, debris is present on the landing floor;
   initiating the rotation of the landing floor cover from the closed position to the open position; and
   initiating the rotation of the landing floor from the horizontal position to the vertical position to provide a clearance of debris on the landing floor.

15. The aircraft landing platform of claim 14, wherein the operations further comprise:
   determining, based on the pressure sensor output signals, aircraft landing gear is not in contact with the landing floor.

16. The aircraft landing platform of claim 13, further comprising an aircraft proximity sensor configured to generate output signals conveying distance from the landing floor cover to one or more aircrafts detected in the vicinity of the aircraft landing platform.

17. The aircraft landing platform of claim 16, further comprising a memory coupled to the processor and storing instructions, which when executed by the processor, cause the processor to perform the operations comprising:
   determining, based on the aircraft proximity sensor output signals, an aircraft is present within a predetermined distance of the landing floor cover; and
   initiating the rotation of the landing floor cover from the closed position to the open position.

18. The aircraft landing platform of claim 1, wherein the landing floor comprises a plurality of drainage holes.

19. The aircraft landing platform of claim 1, wherein the drive mechanism further comprises
   a drive wheel coupled to the motor;
   a cam connected to the landing floor and comprising a first stop and a second stop, the cam configured to rotate about the fixed axis of rotation;
   a drive pin positioned on the drive wheel and connected to the landing floor cover, wherein rotation of the drive wheel causes the drive pin to travel in an arcuate path about the fixed axis of rotation between the first and second stops of the cam, and movement of the drive pin along the arcuate path causes the landing floor cover to rotate between the closed position and the open position;
   wherein rotation of the drive wheel such that the drive pin moves between the first stop of the cam and the second stop of the cam causes the landing floor cover to move between the open position and the closed position without causing the landing floor to rotate, and rotation of the drive wheel such that the drive pin moves beyond a point where the drive pin engages the first stop of the cam simultaneously rotates the landing floor with the landing floor cover from the horizontal position to the vertical position.

20. An aircraft landing platform system, the aircraft landing platform system comprising:
   an aircraft landing platform, comprising:
      a landing floor comprising a top surface;
      a power source configured for providing power to the landing floor;
      a sensor configured to generate output signals conveying presence of debris detected on the landing floor;
      an aircraft landing platform controller comprising a processor and a transmitter communicatively coupled to the landing floor;
      a mount comprising a drive mechanism configured for rotatably coupling the landing floor, the drive mechanism comprising a motor, wherein the motor is configured to rotate the landing floor about a fixed axis of rotation between the landing floor horizontal and vertical positions;
      a landing floor cover, the landing floor cover being rotatable between a closed position, in which the landing cover is covering the landing floor, and an open position;
      wherein the landing floor cover is rotationally coupled with the landing floor by the mount, such that the drive mechanism is further configured to rotate the landing floor cover about the fixed axis of rotation between the closed position and the open position independently of the landing floor using the same drive mechanism; and
      a debris clearing system, comprising a processor configured to:
         receive the pressure sensor signal indicating debris is present on the landing floor;
         responsive to the pressure sensor signal, provide the landing floor cover command to initiate the rotation of the landing floor cover from the closed position to the open position; and
         initiate the rotation of the landing floor from the horizontal position to the vertical position to clear the debris.

21. The aircraft landing platform system of claim 20, wherein the top surface comprises a conductive pattern comprising a plurality of conductive surfaces with positive and negative polarities arranged in a determined pattern configured for providing electrical contact with an aircraft's conductive landing gear.

22. The aircraft landing platform system of claim 20, wherein the drive mechanism further comprises a drive wheel coupled to the motor, and an actuating mechanism coupled to the drive wheel and configured to rotate the landing floor cover and the landing floor, the actuating mechanism comprising:
   a cam connected to the landing floor and comprising a first stop and a second stop, the cam configured to rotate about the fixed axis of rotation;
   drive pin positioned on the drive wheel and connected to the landing floor cover such that the rotation of the drive wheel causes the landing floor cover to rotate between the closed position and the open position; and
   wherein rotation of the drive wheel beyond a point where the drive pin engages the first stop of the cam simultaneously rotates the landing floor and the landing floor cover from the horizontal position to the vertical position.

23. The aircraft landing platform system of claim 22, wherein the actuating mechanism is engaged responsive to the landing floor cover rotating from 180° to 270°.

24. A method for clearing debris from an aircraft landing platform, the method comprising:

determining debris is present on a landing floor included within the aircraft landing platform based on a signal received from a pressure sensor included within the aircraft landing platform;

based on the determination that debris is present on the landing floor, a mount comprising a drive mechanism rotating a landing floor cover mounted on the landing floor from a closed position in which the landing floor cover is covering the landing floor to an open position; and the mount rotating the landing floor from a horizontal position to a vertical position to clear the debris;

wherein the landing floor cover is rotationally coupled with the landing floor by the mount, such that the drive mechanism is configured to rotate the landing floor cover about a fixed axis of rotation between the closed position and the open position independently of the landing floor using the same drive mechanism.

* * * * *